Nov. 29, 1966　　　T. J. KOLESA　　　3,288,085
RAILWAY VEHICLE TRUCK
Filed Nov. 22, 1963　　　　　　　　　2 Sheets-Sheet 1

INVENTOR.
THOMAS J. KOLESA
BY Bedell & Burgess
ATTORNEYS

Nov. 29, 1966  T. J. KOLESA  3,288,085
RAILWAY VEHICLE TRUCK

Filed Nov. 22, 1963  2 Sheets-Sheet 2

INVENTOR.
THOMAS J. KOLESA
BY Bedell & Burgess
ATTORNEYS

United States Patent Office 3,288,085
Patented Nov. 29, 1966

3,288,085
RAILWAY VEHICLE TRUCK
Thomas Joseph Kolesa, Granite City, Ill., assignor to General Steel Industries, Inc., Granite City, Ill., a corporation of Delaware
Filed Nov. 22, 1963, Ser. No. 325,594
8 Claims. (Cl. 105—193)

The invention relates to railway rolling stock and consists particularly in a four-wheel car truck of the type comprising a bolster and separate side frames with means for maintaining the side frames and bolster in normal squared relation.

In conventional railway car trucks having separate relatively movable side frames, the bolster is spring supported at its ends on the side frames and is formed with recesses at both its sides at each of its ends engageable with upright guide surfaces on the side frames, the engagement of the recess surfaces and side frame guides tending to maintain the side frames in right angle relation with the bolster. On newly manufactured trucks this arrangement is entirely satisfactory, but as the cooperating guide surfaces on side frames and bolster wear, the resistance they offer to forces tending to distort them out of their normal squared relation diminishes and trucks so constructed do not remain in their normal squared relationship, particularly when rounding curves, with substantial increase in wear on the wheel flanges and rail due to the tendency of the outer wheels to be retarded by the engagement of their flanges with the outer rail and the consequent retardation of the outer ends of the axles resulting in the axles assuming a substantially less radial position with respect to the center of track curvature than they would assume if the truck frames were maintained in their normal squared relation.

It accordingly is a main object of the invention to provide a four-wheel railway truck of the type having separate side frames with means for maintaining the major axis of the bolster at right angles to the major axes of the side frames irrespective of wear on the cooperating guide surfaces of bolster and side frames.

It is a further object to provide a truck of the separate side frame type in which the bolster is laterally movable relative to the side frames and is held against substantial deviation from its normal right angle relation with the side frames irrespective of its displacement laterally thereof.

The foregoing and additional more detailed objects and advantages are achieved by the structure described hereinafter and illustrated in the accompanying drawings, in which.

Figure 1:
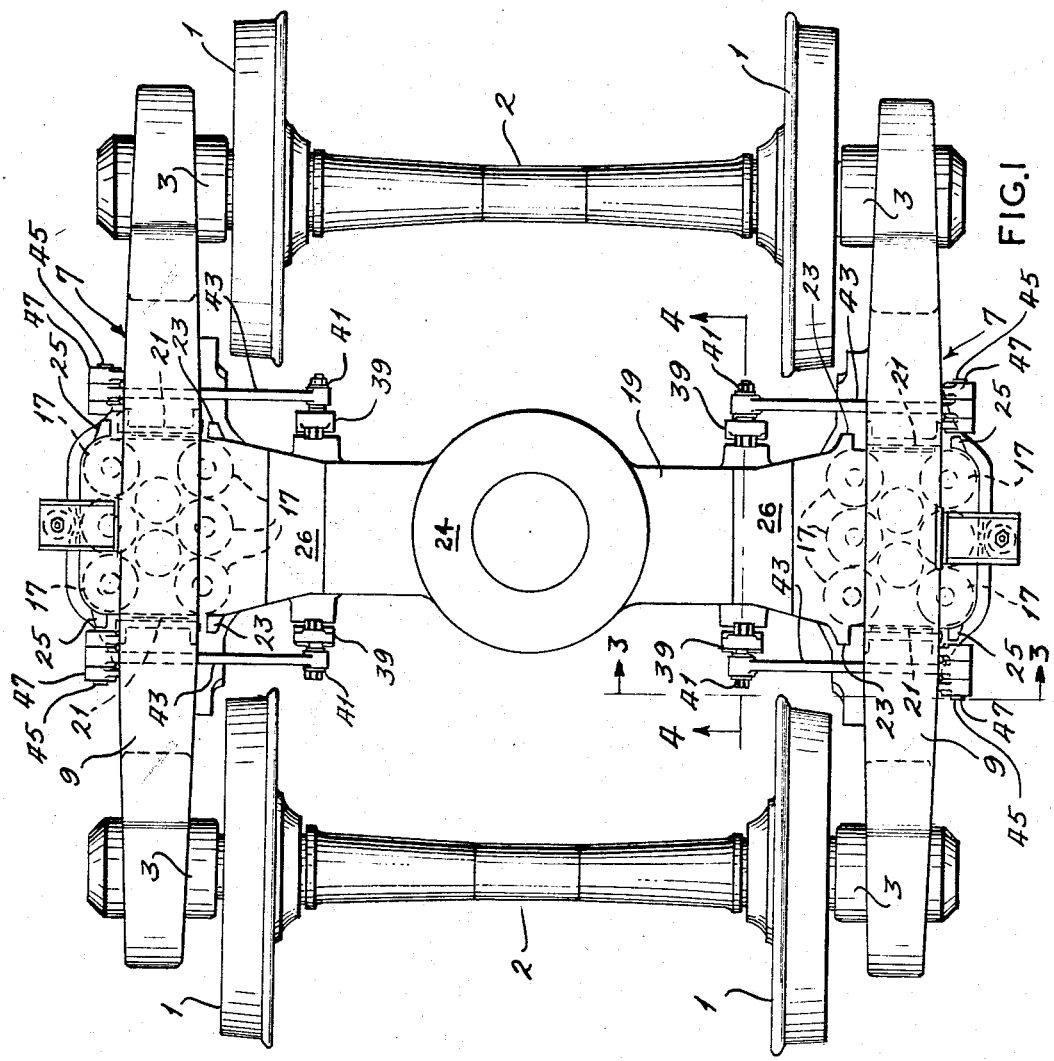
FIG. 1 is a top view of a truck constructed according to the invention.
Figure 2:
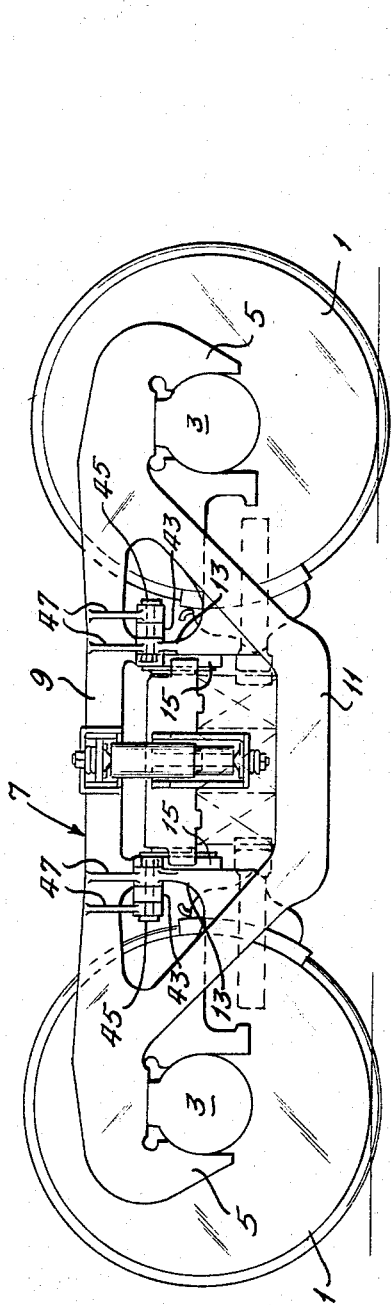
FIG. 2 is a side elevation view of the truck.

The truck includes a pair of spaced assemblies each comprising a pair of wheels 1 and an axle 2, each axle 2 rotatably mounting at its ends journal boxes 3, which are fixedly received in spaced pedestal jaw end portions 5 of spaced side frames 7. Side frames 7 are each of cast steel construction in the form of a queen post truss having, in addition to pedestal jaw end portions 5, a top chord 9, a bottom chord 11 vertically spaced from top chord 9 intermediate its ends and merging at its ends with top chord 9 in the region of the pedestal jaws 5, the horizontal bottom portion of bottom chord 11 being spaced from top chord 9 by the usual upright column 13 on the inner surfaces of which are formed upright guide surfaces 15 in planes extending transversely of the truck.

Upright springs 17 seated on side frame bottom chords 11 support the end portions of a transverse bolster 19, which is formed adjacent its ends with vertical guide surfaces 21 slidably engaging side frame guide surfaces 15 and fixing the position of the bolster longitudinally of the side frames so as to transmit longitudinal forces of acceleration and deceleration from the supported car body to the wheels and vice versa. To accommodate such lateral movement of the bolster relative to the side frames as may be permitted by yieldability of spring 17 in shear, the bolster is provided with outwardly extending stop abutments 23 and 25 spaced, respectively, transversely inwardly and outwardly from the side frames and adapted to engage the transverse inner and outer surfaces of side frame guides 15 when the predetermined limit of lateral movement of the bolster relative to the side frames is reached. Bolster 19 mounts at its center a vehicle body-supporting pivot central bearing 24 and side bearings 26.

For maintaining the bolster in its proper angular relation with the side frames irrespective of wear on cooperating bolster and side frame guides 21 and 15, the bolster 19 is provided near each of its ends inwardly of the side frames with cylindrical openings 27 aligned transversely of the bolster, i.e., longitudinally of the truck. In each of the cylindrical openings 27 is a bearing consisting of inner and outer cylindrical metal shells 29 and 31 with a sleeve 32 of elastomeric material between them. A cylindrical shaft 33 passes through each pair of aligned bearings 29, 31, 32, the protruding portions of shafts 33 being squared as at 35 and the extremities being cylindrical and threaded as at 37. Normally upright arms 39 are fixedly mounted on the squared portions 35 of shafts 33 and are received thereon by nuts 42 so that any movement of one of the arms will cause corresponding rotary movement of the shaft and of the other arm, and the upper ends of arms 39 are pivotally connected at 41 to transversely extending pitmans 43 which extend outwardly therefrom parallel to the major axis of the bolster, and are pivotally connected at their outer extremities as at 45 to brackets 47 on side frame top chords 9 and extending outwardly therefrom. With this arrangement of shaft 33, arms 39 and pitmans 43 the bolster will be permitted unimpeded vertical movements and transverse movements limited only by the yieldability in shear of the springs 17 and the engagement of stop abutments 23 and 25 with the side frame column guides 15, but angular movement in the horizontal plane, of the bolster relative to the side frames, will be prevented because any force tending to move one side of the bolster a further distance transversely of the truck from the adjacent side frame, than the other side of the bolster, will be resisted by the fixed length of pitmans 43 and the rigid nonrotating connections of arms 39 to each other, through shafts 33 and the fixed relation of the latter to the bolster.

Figure 3:
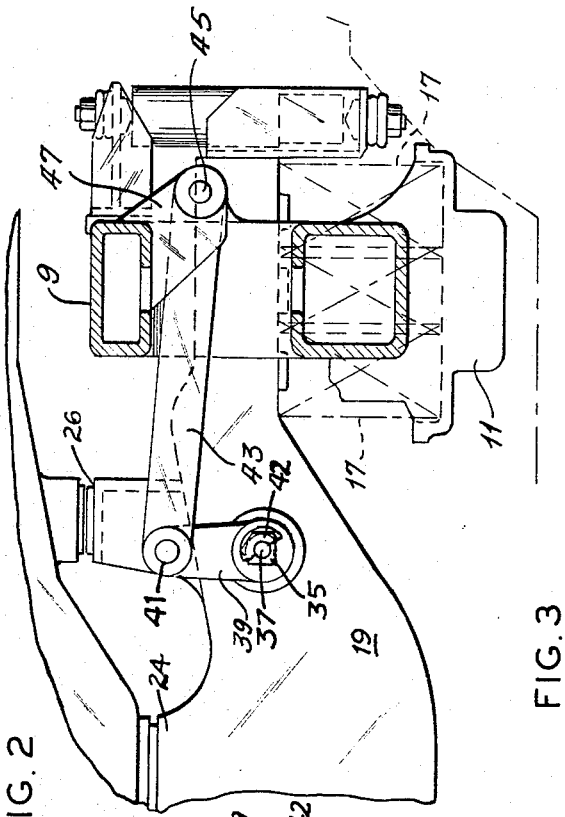
FIG. 3 is a transverse vertical sectional view along line 3—3 of FIG. 1.
Figure 4:
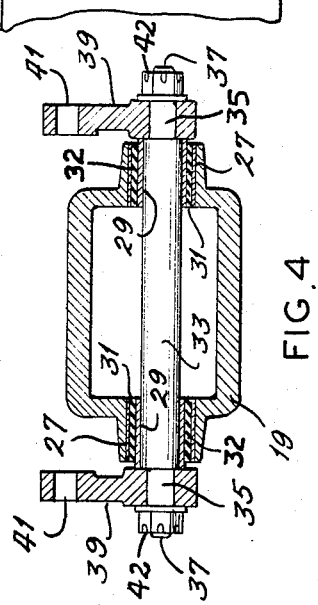
FIG. 4 is a longitudinal vertical sectional view along line 4—4 of FIG. 1.

During operation of the truck all acceleration and braking forces will be transmitted between the wheels and the car body by the engagement of the side frame column guides 15 and bolster guides 21. Lateral track irregularities will be cushioned by lateral movement of the bolster on its supporting springs 17 through deflection in shear of the latter, within the limits permitted by lateral stop abutments 23 and 25. Any forces tending to disturb the normal squared relationship between the side frames and bolster will be resisted by pitmans 43 and the associated arms and shafts. For example, if a force is applied which tends to rotate the lower side frame in FIG. 1 clockwise relative to the bolster, through the right hand pitman 43 shaft 33 will be rotated clockwise as viewed in FIG. 3. This will cause corresponding clockwise rotation of the opposite end of shaft 33 and cause the left hand arm 39 to exert a push on left hand pitman 43 which will maintain the connection 45 of the left hand pitman to the side frame at the same distance from the bolster connection as the right hand connection. Thus irrespective of the application of forces tending to displace the side frames and bolster from their normal relation, this normal relation will be maintained.

The details of the structure may be varied substantially without departing from the spirit of the invention and the exclusive use of those modifications coming within the scope of the appended claims is contemplated.

What is claimed is:

1. A railway vehicle truck comprising a pair of transversely spaced longitudinally extending separate side frames movable with respect to each other, upright springs carried by said side frames intermediate their ends, a transverse load-carrying bolster mounted at its ends on said springs, a pair of shafts extending longitudinally of the truck and each journalled in said bolster inwardly from said side frames, separate pairs of substantially vertical arms fixed respectively to said shafts and spaced apart a substantial distance axially thereof, and pairs of similarly spaced substantially horizontal pitmans extending transversely of the truck and connected respectively at one of their ends to opposite side frames and at the other of their ends to said arms adjacent the corresponding side frame.

2. A railway vehicle truck according to claim 1 including separate bearing structures in said bolster elongated longitudinally of the truck, said shafts being journalled therein.

3. A railway vehicle truck according to claim 2 in which each said bearing structures comprises a pair of bearings spaced apart lengthwise of the truck.

4. A railway vehicle truck according to claim 3 in which said bolster has side walls spaced apart longitudinally of the truck and said bearings are positioned in said side walls.

5. A railway vehicle truck according to claim 1 in which each said side frame and said bolster are provided with slidably engaging transverse surfaces opposing each other in both directions longitudinally of the truck.

6. A railway vehicle truck according to claim 5 in which each of said side frames has a horizontal spring seat portion intermediate its ends and upstanding structure at both ends of said spring seat portion, end portions of said bolster being received between said upstanding structures of the side frames, said upstanding structures carrying said transverse surfaces.

7. A railway vehicle truck according to claim 6 in which said side frames are queen post trusses each having a bottom chord including said spring seat portions, a top chord spaced vertically from said bottom chord, said upright structures forming the columns thereof and, with said top and bottom chords, forming windows in said side frames receiving the end portion of said bolster.

8. A railway vehicle truck according to claim 2 in which said bearing structure includes a sleeve of elastomeric material non-rotatably secured therein and non-rotatably secured around said shaft, rotation of said shaft being accommodated by torsional shear in said sleeve.

References Cited by the Examiner

UNITED STATES PATENTS

| | | | |
|---|---|---|---|
| 912,121 | 2/1909 | Hagberg | 188—130 |
| 2,244,501 | 6/1941 | Pierce | 105—193 X |
| 2,330,305 | 9/1943 | Muchnic | 105—190 |
| 2,390,206 | 12/1945 | Dath | 105—197 |
| 2,558,150 | 6/1951 | Orr et al. | 105—197 |
| 2,592,714 | 4/1952 | Krautheim | 105—190 |
| 3,038,416 | 6/1962 | Janeway | 105—193 |

ARTHUR L. LA POINT, *Primary Examiner.*

H. BELTRAN, *Assistant Examiner.*